United States Patent Office 3,304,332
Patented Feb. 14, 1967

3,304,332
ORGANIC POLYBROMINATED PEROXIDES
Richard A. Bafford, Delmont, Pa., assignor to Koppers Company, Inc., a corporation of Delaware
No Drawing. Filed Feb. 28, 1964, Ser. No. 348,295
4 Claims. (Cl. 260—610)

This invention relates to compounds capable of imparting self-extinguishing flame retardant properties to polymeric materials. In one specific aspect it relates to the treatment of vinyl aryl polymers, especially polystyrene and copolymers of styrene which have been rendered capable of expansion to impart thereto self-extinguishing properties.

In recent years, workers in the art have strived to produce a polymeric foam which is self-extinguishing or flame-retardant. As a prerequisite for the use of polymeric foam as insulating material in building structures, certain specifications set forth by the Fire Underwriters Laboratories with respect to flame-retardant properties of the foam must be met. Polymeric foams are also used to a considerable extent for making decorative and functional objects for home use. From the standpoint of safety it is extremely desirable that such objects be flame-retardant and self-extinguishing.

By "flame-retardant" I mean that the rate of burning of a particular specimen is considerably slower than the rate of burning of an untreated material. After the flame has been removed from the flame-retardant material, it will cease to burn; i.e., it is self-extinguishing. Self-extinguishing characteristics can be accurately evaluated by methods hereinafter described.

Numerous methods for making self-extinguishing polystyrene foam have been suggested by workers in the art. John J. Tress and William H. Heilman in U.S. 3,050,475 provide a method of making flame-retardant self-extinguishing styrene polymer by direct bromination of the polymer in the presence of an activating agent, such as a peroxide. Although the Tress et al. method produces a flame-retardant polymer, difficulties arise because of the corrosion problems attributed to the presence of free bromine or free HBr in the final product. In a series of patents, U.S. 3,058,926, 3,058,927, and 3,058,929, Jacob Eichhorn and his co-workers describe the preparation of self-extinguishing polymers by uniformly dispersing throughout the polymer a bromine-containing compound as a flame-proofing or flame-retarding agent, in combination with a small amount of an organic peroxide as a synergist. The use of the synergist permits use of the bromine-containing flame-retarding agent in amounts which are substantially smaller than that required for rendering the polymer self-extinguishing in the absence of synergist. It is advantageous, in order for the synergistic combination to operate effectively, that the organic bromide and the peroxide be in close proximity of each other.

I have discovered a certain class of stable organic compounds which contain both bromine and peroxide groups in a single molecule. Surprisingly, the use of my novel compounds provides an expandable or expanded polymer of styrene having excellent self-extinguishing properties. Thus, I have eliminated the necessity of using two separate compounds and at the same time I have bound the bromine to the peroxide as part of a single entity.

It is therefore an object of the present invention to provide a novel organic compound containing bromine and peroxide groups in a single molecule.

It is another object of the present invention to provide novel self-extinguishing expandable polymer particles capable of expansion by conventional means to form self-extinguishing flame retardant foam.

In accordance with the invention, I have provided a self-extinguishing expandable polymer of styrene having been rendered capable of expansion by incorporation therein of a volatile aliphatic hydrocarbon boiling in the range of −10 to 81° C. and having uniformly dispersed throughout from 0.5 to 5 percent by weight of an organic polybrominated peroxide of the formula:

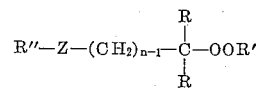

wherein R is a member selected from the group consisting of lower alkyl and hydrogen, R' is tertiary lower alkyl, R" is a member selected from the group consisting of R and

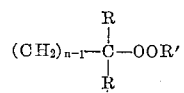

wherein R and R' are as defined above; Z is a member selected from the group consisting of CHX—CHX, CX=CX and $CX_2$—$CX_2$ wherein X is bromine and $n$ is an integer having a value of 1–7.

The term "polybrominated" as used in the present invention means that the compound contains at least two bromine atoms per molecule. The bromine atoms are preferably attached to adjacent or vicinal carbon atoms in an aliphatic radical. While the organic polychlorinated peroxides may also be used for some purposes, it has been found that the chlorinated compounds have considerably reduced self-extinguishing properties when compared to the novel organic polybrominated peroxides. The expression "peroxide having at least one tertiary alkyl group" as used herein, means that a tertiary alkyl group is attached to at least one of the oxygens of the peroxide.

Examples of organic polybrominated peroxygen compounds included within the above general formulation and which organic polybrominated peroxides are operable in the invention are symmetrical and unsymmetrical polybrominated peroxides having at least one tertiary alkyl group such as:

2,3-dibromopropyl t-butyl peroxide,
3,4-dibromo-2,5-dimethyl-2,5-di(t-butylperoxy)hexene-3,
3,4-dibromobutyl t-amyl peroxide,
2,2,3,3-tetrabromo-1,1-dimethylpropyl t-butyl peroxide,
2,3-dibromo-1,1-dimethyl-2-propenyl t-butyl peroxide,
2,3-dibromobutyl t-butyl peroxide,
2,3-dibromo-2-pentenyl t-butyl peroxide,
1,8-bis(t-butylperoxy)4,5-dibromooctane,
2,3-dibromo-1,1-diethyl-2-butenyl t-butyl peroxide, and
7,8-dibromooctyl t-butyl peroxide.

The polymers useful in preparing the expandable compositions of the invention are the vinyl aryl polymers, particularly polymers of styrene, including polystyrene, or copolymers of styrene and such monomers as butadiene, alpha-methylstyrene, isobutylene, acrylonitrile, acrylic acid, methacrylic acid, and the like.

The preferred polymeric particles used in the invention are commercially avilable, spherical or irregularly shaped particles ranging in size of, for example, through six mesh on to 60 mesh (U.S. sieves).

The organic polybrominated peroxide is employed in amounts corresponding to from 0.5 to five percent by weight of the polymer. If less than 0.5 percent by weight of the compound is used the polymer will lack adequate self-extinguishing properties. Excessive amounts of the compound have a deleterious effect on the properties of the ultimate polymer. The exact amount used depends upon the bromine content and the peroxide content of the particular organic polybrominated peroxide used. In most cases it is preferable to use between about one and three percent by weight of the self-extinguishing agent based upon the weight of the polymer.

The novel organic polybrominated peroxides of the present invention can be prepared by several conventional methods. These methods include: the acid-catalyzed condensation of brominated tertiary alcohols with hydrogen peroxide in the presence of 70 percent sulfuric acid at ambient temperature; the acid-catalyzed condensation of tertiary alcohols and hydroperoxides in the presence of 70 percent sulfuric acid and the condensation of a t-alkyl hydrogen sulfate with a t-alkyl hydroperoxide at 0 to 20° C.; the condensation of alkyl halides with hydroperoxides by the reaction of salts of hydroperoxides with alkylhalides; and the bromination of unsaturated peroxides by the reaction of an unsaturated peroxide with bromine at room temperature in acetic acid. From my experience, the simplest method of preparing the novel organic polybrominated peroxides is by the bromination of unsaturated peroxide.

The organic self-extinguishing agent can be incorporated within the polymer by any method which gives uniform distribution of the agent throughout the body of the polymer and which does not cause or result in appreciable deterioration or decomposition of either the polymer or the self-extinguishing agent. Thus, the novel composition can be incorporated into the polymer by post-impregnation in the polymer particles after polymerization has been completed or alternatively the composition can be added to the polymerizing monomer during suspension polymerization. However, care must be exercised in selecting the particular organic polybrominated peroxide for addition to the suspension polymerization formulation since in some instances a deleterious effect on the polymer is produced, such as the forming of a yellow discoloration and lowering the pH of the suspension system by the formation of acids such as hydrobromic acid.

Thus, conveniently, the fire-retarding organic polybrominated peroxide can be added during the incorporation of the volatile aliphatic hydrocarbon, which is best accomplished by the general method described in the D'Alelio patent, supra. By the D'Alelio method a stable aqueous suspension is formed containing the polymer particles and the aliphatic hydrocarbon. Intimate contact is maintained between the hydrocarbon and the polymer, thereby incorporating into the polymer 4.5–9 percent by weight of the hydrocarbon based on the weight of the particles. The suspensions are stabilized by an organic or inorganic suspending agent, such as alkylaryl sulfonates, hydroxyethyl cellulose, polyvinyl alcohol, zinc oxide, calcium carbonate, bentonite, talc, kaolin, calcium phosphate, aluminum oxide, barium sulfate, magnesium carbonate, and the like. Particularly effective are the difficultly soluble phosphates described in U.S. Patent 2,594,913 of J. M. Grim.

Generally, the impregnation of the polymeric particles is accomplished by maintaining the temperature between about 70–120° C. for one to six hours. The above-specified amount of organic polybrominated peroxide is added to the suspension or carried into and dispersed throughout the polymer along with the hydrocarbon blowing agent.

After impregnation with the aliphatic hydrocarbon is complete, the polymer particles are de-watered and washed. Generally, if an organic stabilizing agent is used in the suspension, a water wash is sufficient. If an inorganic dispersant, such as calcium phosphate, is used, the polymer suspension is adjusted to a pH below about 1.8 by the addition of strong concentrated mineral acid, e.g., HCl or $HNO_3$. A water wash is then used to remove free acid from the polymer particles.

The polymer particles are dried at ambient or at slightly elevated temperatures. The particles may be simply spread on a flat surface and allowed to dry at room temperature until they are free-flowing. In commercial practice, expandable polymeric particles are placed in a forced circulation oven for from 10 to 20 minutes at about 90–130° F. Drying time and temperature vary with the degree of air circulation achieved in the oven and the thickness of the particle layer to be dried. Care is taken to avoid any substantially volatilization of the aliphatic hydrocarbon within the particles.

The novel self-extinguishing expandable particles of the invention may be heated directly using conventional means to make a low density foam, i.e., one having a density of less than three pounds per cubic foot, or they may be stored or sold to foam producers. The particles may also be partially expanded to produce an integral, free-flowing, low density product from which only a portion of the aliphatic hydrocarbon has been volatilized. Such partially expanded particles are quite suitable for molding purposes. The partial volatilization may be accomplished by heating using steam, hot water, infrared or radio frequency means. The pre-expanded particles may be stored or sold as such. They are further expanded by the application of heat in the manner hereinbefore described to make an integral, low density, self-extinguishing foam.

The self-extinguishing properties of the composition of the invention are evaluated by foaming the compositions in a mold in the conventional manner and cutting the molded specimens into strips 5" x 1" x ½". The strips are mounted vertically and flame is applied to the lower end of the strip. The time required for flame-out, in seconds, is the measure of the self-extinguishing characteristics of the product foam.

An alternative method of determining self-extinguishing characteristics involves forming dry castings of dense foam from solutions of polystyrene and methyl chloride. Test specimens are made by dissolving 5 g. polystyrene foam particles in 20 ml. of methyl chloride and foaming castings in an air stream. The plate-like specimens of dense irregular foam are mounted in a vertical plane throughout the edge and contacted for three seconds with a ½ inch yellow flame of a micro burner, measuring the time for the flame to be extinguished by a stop watch.

Any foam requiring more than 15 seconds for flame-out is considered non-self-extinguishing. A self-extinguishing time of 8–10 seconds is considered poor; 4–8 seconds, fair; 2–4 seconds, good; and below 2 seconds, excellent. The novel organic polybrominated peroxides of the invention when used in the prescribed amounts provide foams having good to excellent self-extinguishing characteristics.

My invention is further illustrated by the following examples.

*Example I*

A solution of 2 g. (0.012 mole) of bromine in 10 ml. of acetic acid was added to a stirred solution of 2 g. (0.007 mole) of 2,5-dimethyl-2,5-di(t-butylperoxy)hexyne-3, available commercially under the trademark Lupersol-130, in 25 ml. of acetic acid. The mixture was stirred overnight at ambient temperature. Most of the acetic acid was removed in vacuo and the residue was taken up in ether. The ethereal solution was washed with water and sodium bicarbonate solution and then was dried over magnesium sulfate. The solution was stripped of low-boilers in vacuo leaving a residue of 2.5 g. of an orange oil ($n_D^{25°}$ 1.4683) identified as 3,4-dibromo-2,5-dimethyl-2,5-di(t-butylperoxy)hexene-3. Bromine analysis: calculated 35.8%; found 35.3%.

When the preparation was carried out in chloroform or benzene, essentially the same results were obtained.

*Example II*

A solution of 0.86 g. (0.0054) of bromine, 0.8 g. (0.005 mole) of 2-methyl-2-(t-butylperoxy)butyne-3 and 10 ml. of chloroform was stirred overnight at ambient temperature. The reaction mixture was washed with sodium bisulfite solution, water, and sodium carbonate solution. The dried ($MgSO_4$) solution was stripped in vacuo and the residue was distilled at reduced pressure. The yield of colorless dibromoperoxide (B.P. 40–41° at 0.1 mm.; $n_D^{22°}$ 1.4884) was 1.0 g. (62%). The infrared spectra of the crude and distilled product were identical indicating absence of any decomposition during distillation.

*Example III*

A solution of 3.7 g. (0.023 mole) of bromine in 8 ml. of chloroform was slowly added to a well-stirred solution of 3 g. (0.025 mole) of allyl-t-butyl peroxide in 10 ml. of chloroform. External cooling was necessary to keep the reaction temperature below 8°. The reaction mixture was stripped under reduced pressure leaving 6.1 g. of crude product. Distillation at high vacuum gave 2,3-dibromopropyl t-butyl peroxide in a yield of 5.4 g. (81%) having a B.P. 50–51° at 0.2 mm. and $n_D^{24°}$ 1.4859. Bromine analysis: calculated 55.2%; found 54.3%.

*Example IV*

Styrene was polymerized in suspension to at least 99.7 percent conversion. The polymer was obtained in the form of spheres, predominantly through 10 to on 30 mesh (U.S. sieves). The spheres were impregnated with pentane in aqueous suspension by the method of D'Alelio, hereinabove described. The expandable particles thus obtained were preexpanded by steam in the conventional manner. A series of test castings were made by dissolving 5 g. of polystyrene foam particles in 20 ml. of methyl chloride containing various amounts of 3,4-dibromo-2,5-dimethyl-2,5-di(t-butylperoxy)hexene-3, ranging from 0.25–2.0 percent based on the weight of the polymer. The castings were foamed in an air stream and the resulting plate-like specimens of dense irregular foam about five inches in diameter and ½ inch thick, were mounted in a vertical plane throughout the edge and contacted for three seconds with a yellow flame of a micro burner. The time for the flame to be extinguished was measured by a stop watch. Test results are shown in Table I.

TABLE I

| Test | Organic Polybrominated Peroxide (Percent) | Flame-Out Sec.ᵃ |
|------|-------------------------------------------|-----------------|
| A    | 2.0                                       | 1.0             |
| B    | 1.0                                       | 7.3             |
| C    | 0.5                                       | Not SE ᵇ        |
| D    | 0.25                                      | Not SE ᵇ        |

ᵃ Average for 5 specimens.
ᵇ Self-Extinguishing.

It is seen that 3,4-dibromo-2,5-dimethyl-2,5-di(t-butylperoxy)hexene-3 is an effective self-extinguishing agent in concentrations slightly over one percent.

*Example V*

The procedure of Example IV was substantially repeated using 2,3-dibromopropyl t-butyl peroxide as the organic polybrominated peroxide in concentrations ranging between 1.5–4.0 percent based on the weight of the polymer. The results indicated that a minimum of about two percent of the organic polybrominated peroxide was required to produce excellent self-extinguishing characteristics.

*Example VI*

The organic polybrominated peroxide of Example V was added to the polymerizing monomer during suspension polymerization. To the following ingredients: 80 grams of styrene monomer, 0.20 gram of benzoyl peroxide and 0.12 gram of tertiary butyl perbenzoate, 113 grams of water, 7 grams of a two percent solution of hydroxyethyl cellulose and 0.08 gram of tetrasodium pyrophosphate was added 2,3-dibromopropyl t-butyl peroxide over a range of 0.5 to 2.50 percent based on the weight of the monomer.

These ingredients were charged to 12 ounce crown cap bottles and heated at 92° C. for seven hours in an end over end tumbling oil bath. At the end of this period, 2 ml. of five percent solution of emulsifier was added to each bottle. In addition to the emulsifier 10 ml. of normal pentane were also added and the bottles recapped. Heating was continued at a temperature of 92° C. for one hour, then raised to 115° C. for four hours, after which the contents were cooled. The bead slurries from these samples were washed thoroughly with warm water at about 50° C. and spread out on paper towels to air dry. The resultant dry beads were then expanded by the application of steam to form preexpanded beads having an average bulk density of 1½ to 2 pounds per cubic foot.

The preexpanded beads were molded into sheets approximately six inches square by ½ inch thick and these sheets were cut into one inch by five inches long strips for the burning test. Five strips of each sample were suspended vertically in the same manner as described for the methyl chloride test, the micro burner flame was applied for a time of two seconds and removed, and the time for the strips to extinguish the flame was recorded. The results are shown in Table II.

TABLE II

| Test | Organic Polybrominated Peroxide (Percent) | Flame-Out Sec. ᵃ |
|------|-------------------------------------------|------------------|
| A    | 2.50                                      | 0.6              |
| B    | 2.00                                      | 0.6              |
| C    | 1.50                                      | 1.05             |
| D    | 1.00                                      | 1.1              |
| E    | 0.50                                      | 2.5              |
| F    | 0.25                                      | Not SE ᵇ         |

ᵃ Average for five specimens.
ᵇ Self-Extinguishing.

It is seen that 2,3-dibromopropyl-t-butyl peroxide is an excellent self-extinguishing agent when present in concentrations as low as one percent and is effective in concentrations as low as 0.5 percent.

I claim:

1. A compound having the formula:

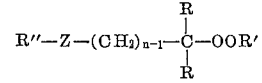

wherein R is a member selected from the group consisting of lower alkyl and hydrogen, R' is tertiary lower alkyl, R'' is a member selected from the group consisting of R and

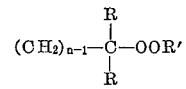

wherein R and R' are as defined above; Z is a member selected from the group consisting of CHX—CHX, CX=CX and CX₂—CX₂ wherein X is bromine and $n$ is an integer having a value of 1–7.

2. 2,3-dibromopropyl t-butyl peroxide.

3. 3,4-dibromo - 2,5 - dimethyl-2,5-di(t-butylperoxy)-hexene-3.

4. 3,4-dibromo-2-methyl-2-(t-butylperoxy)butene-3.

References Cited by the Examiner

UNITED STATES PATENTS 3,058,928 10/1962 Eichhorn et al. _____ 260—2.5
3,058,929 10/1962 Vanderhoff et al. _____ 260—2.5

OTHER REFERENCES

Bevington et al.: Bromine Containing Peroxide, Die Makromole Chemie, vol. 32, pp. 57–65, July 1959.

MURRAY TILLMAN, *Primary Examiner.*

G. F. LESMES, N. F. OBLON, M. FOELAK,
*Assistant Examiners.*